United States Patent
Tenhaeff et al.

(10) Patent No.: US 9,908,565 B2
(45) Date of Patent: Mar. 6, 2018

(54) AXLE SUPPORT OF A MOTOR VEHICLE

(71) Applicant: Bayerische Motoren Werke Aktiengesellschaft, Munich (DE)

(72) Inventors: Katja Tenhaeff, Munich (DE); Michael Keigler, Munich (DE); David Keller, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/487,740

(22) Filed: Apr. 14, 2017

(65) Prior Publication Data

US 2017/0217502 A1    Aug. 3, 2017

Related U.S. Application Data

(63) Continuation of application No. PCT/EP2015/073415, filed on Oct. 9, 2015.

(30) Foreign Application Priority Data

Oct. 16, 2014  (DE) ........................ 10 2014 221 079

(51) Int. Cl.
*B62D 29/00* (2006.01)
*B62D 21/11* (2006.01)
(Continued)

(52) U.S. Cl.
CPC ............ *B62D 29/001* (2013.01); *B29C 35/02* (2013.01); *B29C 63/24* (2013.01); *B62D 21/11* (2013.01);
(Continued)

(58) Field of Classification Search
CPC ............................... B62D 29/001; B62D 21/11
(Continued)

(56) References Cited

U.S. PATENT DOCUMENTS 5,836,712 A * 11/1998 Zetterstrom ........... B60G 6/001
403/267
6,073,991 A *  6/2000 Naert .................... B60G 7/001
296/187.02
(Continued)

FOREIGN PATENT DOCUMENTS

DE   10 2011 113 662 A1   3/2013
EP      2 399 727 A1     12/2011
WO   WO 2014/029539 A1    2/2014

OTHER PUBLICATIONS

International Search Report (PCT/ISA/210) issued in PCT Application No. PCT/EP2015/073415 dated Dec. 10, 2015 with English translation (seven (7) pages).
(Continued)

*Primary Examiner* — Faye M Fleming
(74) *Attorney, Agent, or Firm* — Crowell & Moring LLP

(57) ABSTRACT

An axle support of a motor vehicle has two longitudinal supports and at least one cross-beam which is connected to connection points with the cross-beams having body connection points in the end areas thereof. The axle support can be installed with identical dimensions in different types of motor vehicle with respect to the weight and/or drive power thereof. When using the axle support in a type of motor vehicle with a heavy weight and/or high driving power, at least one connecting point is wound with a reinforcement element made from fiber-reinforced plastic, which, in another type of vehicle with a lower weight and/or lower driving power is either not provided or is provided in smaller dimensions.

18 Claims, 1 Drawing Sheet

(51) Int. Cl.
  *B29C 63/24* (2006.01)
  *B29C 35/02* (2006.01)
  B29K 105/08 (2006.01)
  B29L 31/30 (2006.01)

(52) U.S. Cl.
  CPC ... *B29K 2105/0872* (2013.01); *B29L 2031/30* (2013.01)

(58) Field of Classification Search
  USPC .................................................. 280/124.109
  See application file for complete search history.

(56) References Cited

U.S. PATENT DOCUMENTS

| | | |
|---|---|---|
| 6,408,515 B1 | 6/2002 | Durand |
| 7,958,963 B2 * | 6/2011 | Hornisch ............... B62D 21/11 |
| | | 180/312 |
| 9,096,271 B2 * | 8/2015 | Renner .................. B62D 21/11 |
| 9,650,083 B2 * | 5/2017 | Graefe .................... B29C 43/16 |
| 2012/0280534 A1 | 11/2012 | Eipper |
| 2015/0166105 A1 | 6/2015 | Zander et al. |

OTHER PUBLICATIONS

German-language Written Opinion (PCT/ISA/237) issued in PCT Application No. PCT/EP2015/073415 dated Dec. 10, 2015 (five (5) pages).

* cited by examiner

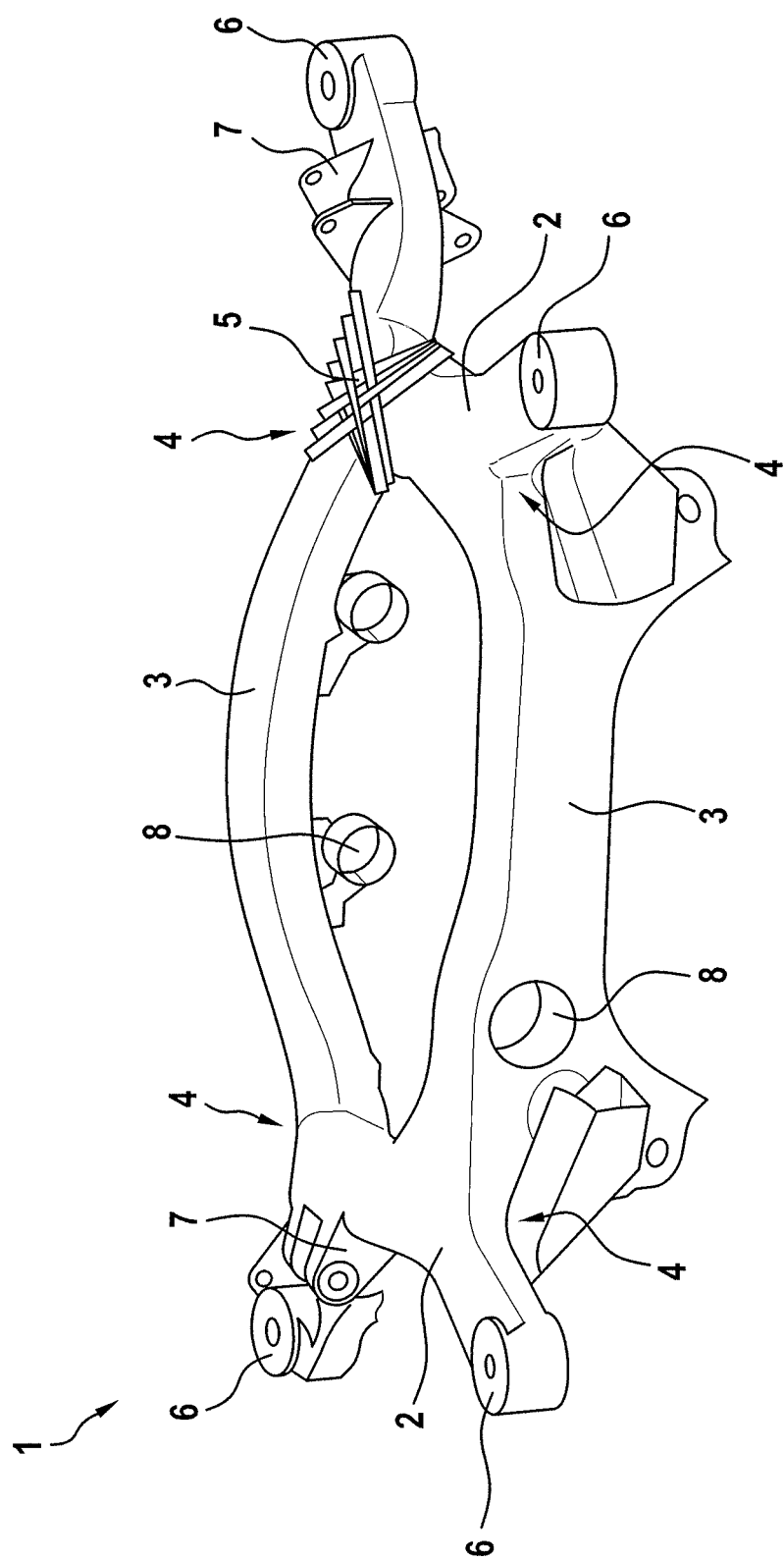

AXLE SUPPORT OF A MOTOR VEHICLE

CROSS REFERENCE TO RELATED APPLICATIONS

This application is a continuation of PCT International Application No. PCT/EP2015/073415, filed Oct. 9, 2015, which claims priority under 35 U.S.C. § 119 from German Patent Application No. 10 2014 221 079.8, filed Oct. 16, 2014, the entire disclosures of which are herein expressly incorporated by reference.

BACKGROUND AND SUMMARY OF THE INVENTION

The invention relates to an axle support for a motor vehicle, and to a method for producing the axle support.

Axle supports of motor vehicles, for example passenger motor vehicles, normally comprise two longitudinal members and one or two crossmembers which connect the longitudinal members. The axle supports are situated below and fastened to the vehicle body and serve for the attachment of the wheel suspension arrangement. Normally, the same axle supports are used for different derivatives of a vehicle type series, which derivatives, while having geometrically identical primarily relevant dimensions, have different engine configurations or are of different weights. The different derivatives are thus different motor vehicle types which differ from one another with regard to their drive power and/or with regard to their weight, but which are identical with regard to the geometric dimensions at least of the axle support.

It has hitherto been necessary for the same axle support to be designed and dimensioned for the different motor vehicle types with regard to the maximum occurring loadings or loads. Here, as is conventional in the field of engineering, the expression "dimensioning" describes the specification of dimensions, shaping and material characteristics on the basis of objective criteria during the course of the design of the respective component. Here, a starting point in the dimensioning process is the consideration of the demands placed on the component, and a goal of the dimensioning is to specify the required and optimum size and load capacity of a component. It is self-evident, owing to the fact that an axle support provided for different motor vehicle types is designed for the maximum possible loading, that such an axle support is overdimensioned for a motor vehicle type in the case of which only a relatively low maximum loading can arise. Such overdimensioning is however undesired for weight and cost reasons. For otherwise substantially structurally identical motor vehicle types, the magnitude or level of the maximum loading is dependent, in particular, on the vehicle weight and on the drive power of the vehicle drive assembly.

It is an object of the present invention to provide a remedy for the problem highlighted above.

This and other objects are achieved by an axle support, and method of making same, in accordance with embodiments of the invention.

The invention is generally applicable to or for a metallic axle support. Specifically, it has been identified that, in the case of axle supports which are preferably composed of light metal alloys or are assembled from light metal supports, the connection points between the supports constitute the major weak points, for which reason, in the hitherto conventional prior art, the individual supports themselves have been practically overdimensioned merely in order to ensure adequate strength of said connection points. This is avoidable by means of the features according to the invention.

It is thus basically (and uniformly) proposed that a motor vehicle axle support be strengthened at the connection points between the longitudinal members of the axle support and the (possibly several provided) crossmember(s) by virtue of fiber-reinforced plastic being wound around said connection points (and possibly also in the direct vicinity thereof if the connection point itself is relatively narrow and formed, for example, by a weld seam). The fiber-reinforced plastics material that is wound around then forms a reinforcement element of the axle support. Such a reinforcement measure is basically possible not only on metallic axle supports but also on axle supports whose longitudinal members and crossmembers are themselves composed of fiber-reinforced plastic; on the latter, such a measure may however also be easier to achieve, if it is sought to implement this on any manufactured axle support, through suitable design of the respective supports. A reinforcement element according to the invention basically makes it possible to realize a longer service life of an axle support, because mechanical stresses in the base material are thereby reduced and, in any case on a metallic axle support, the weld seams provided there between longitudinal members and crossmembers are relieved of load. Also, an improvement in acoustic characteristics and increased vibration damping can be achieved by use of such reinforcement elements.

Discussing now the problem mentioned in the introduction, there is furthermore proposed an axle support which is provided for different motor vehicle types (and which at the same time has identical geometric dimensions), comprising two longitudinal members and at least one crossmember which connects the two longitudinal members. The axle support is designed for fastening to a body of the vehicle. In turn, the wheel suspension arrangement can be fastened to the axle support. The longitudinal members are connected at connection points to the at least one crossmember. In a usage situation for or in a certain motor vehicle type which is distinguished by a relatively high weight and/or a relatively high level of drive power (of the vehicle drive unit), at least one of the connection points (and preferably all of the connection points) is/are equipped with a reinforcement element which is formed by virtue of fiber-reinforced plastic being wound around the connection point. Here, use is made in particular of a fiber-reinforced band (tape) and a plastics matrix. It has been identified that an, as it were, favored weak point of the axle support which can be configured with different dimensions for use in different motor vehicle types is the connection region between the longitudinal members and the one or more crossmembers. It is thus not necessary for the connection region to be designed for that vehicle derivative or that vehicle type which places the highest demands on the axle support with regard to strength or operational reliability. Rather, it is possible, in particular, for the connection region of the axle support constructed using otherwise identical structural elements (specifically longitudinal members and crossmembers) to be designed independently of type. This is possible in a particularly simple and efficient manner by virtue of fiber-reinforced material (that is to say fiber-reinforced plastic) being wound or not wound, or wound differently (in particular with regard to thickness or height and/or width), around the connection region, whereby it is easily possible for one or more reinforcement elements to be formed, in accordance with the respective individual requirements, in locally limited fashion at major weak points (and thus not so as to cover the entire axle support or the entire longitudinal members and crossmembers thereof). By virtue of a fiber-reinforced band or plastics material being wound around the connection points, and thus by virtue of a reinforcement element being formed, it is possible for an axle support that is to be configured for relatively high loads to be reinforced, and thus to be used for vehicle types involving higher requirements, in relation to an otherwise geometrically identical axle support which only has to accommodate relatively low maximum loads.

A reinforcement element according to the invention (and suitable for the inventive axle supports), or the wound-on fiber-reinforced plastic, may be connected by thermal joining to the connection point of the crossmember and the longitudinal member and thus also correspondingly—depending on the manner in which the connection point is designed—to the crossmember and/or longitudinal member. For said thermal joining, use is made in particular of the plastics matrix of the reinforcement element. Such thermal joining produces a cohesive connection if the base material of the axle support and/or of the connection point itself is a thermoplastic material. By contrast, if the axle support and/or the connection point is composed of a metallic material (=base material of the axle support), use can be made of the known welding-on of plastics material onto a metal material, that is to say the fundamentally known thermal direct joining of a plastics-metal material pairing is implemented here.

During the course of the thermal joining between plastic and metal, that is to say during the welding-on for example of a plastics matrix which comprises reinforcement fibers (and thus constitutes the fiber-reinforced plastic that forms the reinforcement element according to the invention), it is the case, in effect, that a microscopic form fit or a form fit in the nanoscopic range is produced between the plastics material and the surface of the metallic component. The latter is now the connection point which is preferably formed by sections of the longitudinal member and the crossmember, such that the reinforcement element according to the invention is connected by thermal joining to the base material of the axle support. For this so-called welding-on of a plastics material, suitable surface pretreatment of the metallic main body, commonly also referred to as pickling, may also be necessary, along with the possible provision of an adhesion promotion layer or an adhesive layer. Such layers advantageously also offer protection against contact corrosion for example between carbon reinforcement fibers which are embedded in the plastics matrix and a light metal alloy (of the axle support). For this pickling, it is possible, after a cleaning process, for structuring of the metal surface in the nanoscopic or microscopic range to be performed in order that, during the welding to the plastics matrix of the reinforcement element, the desired microscopic form fit can be generated. A plasma pretreatment of the metallic component section in question is also possible. By contrast, for an axle support whose longitudinal members and crossmembers are themselves composed of fiber-reinforced plastic, a cohesive connection to a reinforcement element according to the invention can be easily realized in a known manner.

Alternatively or in addition to the cohesive connection, a form fit of the reinforcement element to the connection point that is visible to the naked eye (by contrast to the microscopic form fit mentioned above) is possible; this may be formed either by a separate component or preferably by a longitudinal member and a crossmember themselves. Such a visible form fit with the so-called "base structure" of the axle support or of its said connection point may, for example, also be formed through the provision of structures (=elevations or depressions) or by means of pins or the like in the respective base component to be reinforced—this is preferably the longitudinal member or the crossmember, or alternatively any suitably designed connection element.

The reinforcement element is preferably formed by a band comprising a multiplicity of reinforcement fibers, and advantageously has unidirectional reinforcement fibers which, by means of corresponding winding of the band, can be wound in crosswise fashion around the connection point. At the connection point, it is normally the case that the longitudinal member and the crossmember meet one another approximately at a 90° angle. The band is then advantageously wound in crosswise fashion around the connection point between the two members such that the reinforcement fibers of the unidirectional band cross one another several times. In relation to the longitudinal axis of the crossmember, the reinforcement fibers may, in alternating fashion, specifically in a manner wound one on top of the other, enclose for example an angle in the region of 15° and 165° with the longitudinal axis. For example, the sequence of layers (lying one on top of the other) may be configured such that, firstly, all of the reinforcement fibers are wound in a first direction (for example at) 15°, and then subsequently, all of the reinforcement fibers are wound in a second direction (for example at)165°; alternatively, an alternately changing fiber orientation (for example 25°, 155°, 15°, 165°, etc.) is also possible in order to form a mesh. Winding configurations assembled in piecewise fashion, or only partial winding configurations, are self-evidently also possible, and a preferred thickness of the reinforcement element formed by wound reinforcement fibers with plastics matrix lies in the range from 0.3 mm to 5 mm. In the case of a multiply wound band which itself may have for example a thickness in the range from 0.1 mm to 0.3 mm, it is thus possible for between 2 and approximately 15 layers of said band wound one on top of the other to be provided.

As regards the essential structural elements of the axle support, specifically the longitudinal members and the at least one (or multiple) crossmember(s), these may be composed of a metal, such as steel or a light metal alloy, or may themselves alternatively also be composed of fiber-reinforced plastic. Said members may however also be of hybrid construction, such that they are for example composed of one of the abovementioned materials only in the vicinity of said connection region and, in other regions, are composed of another (arbitrary) material. Also, as regards the connection between a longitudinal member and crossmember, the connection may be of cohesive or form-fitting or force-fitting form. For this purpose, the members may be welded or screwed to one another and/or designed such that, for example, the crossmember is inserted with its suitably shaped end sections into a respective correspondingly shaped receptacle of the longitudinal member.

As regards the reinforcement fibers of the fiber-reinforced plastic that forms the reinforcement element according to the invention, these may preferably be carbon fibers, glass fibers, aramid fibers or natural fibers. Here, a combination of different fiber-reinforced plastic semifinished products is also possible. It is furthermore possible, for example, for suitable intermediate layers, or generally any additional layers composed of non-reinforced, that is to say non-fiber-reinforced, material to be provided between layers of fiber-reinforced plastic, which material may for example be a viscoelastic material. Such additional layers may for example be provided between the (metallic) main body of the axle support and the first applied fiber-reinforced plastic layer (=FRP layer) and/or between the individual FRP layers or on the surface of the reinforcement element. In the latter case, such an additional layer may in particular serve for protection against external effects, for example stone impact, whereas in other cases, aside from an elimination of contact corrosion as already mentioned further above, that is to say for the purposes of achieving galvanic separation, it is also possible for an improvement in adhesion between the different layers or materials to be achieved. Also, such an in particular elastic additional or intermediate layer may serve for compensating different thermal expansions of different materials, and may effect damping in particular with regard to the acoustic characteristics of an axle support according to the invention, though may also dampen mechanical vibrations.

As is conventional, the axle support includes wheel attachment points for the fastening of wheel-connecting components such as for example wheel supports, pivot bearings, longitudinal links, transverse links or tension struts. Furthermore, body attachment points are provided on the axle support. By means of the body attachment points, the axle support is connected to the body of the vehicle. It is furthermore possible for bearing points to be formed in particular on the crossmember. An engine or a gearbox can be fastened in the axle support by use of the bearing points.

The invention furthermore includes a method for producing the described axle support. Here, forming of the reinforcement element on the connection point is realized by winding a fiber-reinforced band around the connection point. Numerous variants are possible for forming the plastics matrix. In a first variant, a thermosetting matrix is used. Here, the band is wound with the wet thermosetting matrix and is subsequently cured. As an alternative to, it is possible for a preimpregnated band to be used. Here, the band is preimpregnated with a thermoplastic matrix. It is also possible for hybrid yarns to be used instead of the preimpregnated band. Such hybrid yarns comprise the reinforcement fibers with integrated thermoplastic material. In the case of the thermoplastic matrix, the band or the matrix is heated before, during and/or after the winding process. Both the thermosetting matrix and the thermoplastic matrix, in the cured state, not only connect the individual reinforcement fibers to one another but can also, in the case of direct contact, produce cohesion or quasi-cohesion, specifically the abovementioned microscopic form fit or form fit in the nanoscopic range, with the connection point. Heat and advantageously pressure are used to consolidate the fiber-reinforced reinforcement element. Here, it is preferably provided that the heat is introduced by way of an external device, for example a laser or infrared device, or by heat conduction via the metallic axle support, or via the fibers composed of carbon. The fiber-reinforced plastics material, for example in the form of a band, is furthermore pressed with a certain force against the surface of the connection point, which in the case of a band may be realized by use of tension at a suitable angle relative to the surface.

Other objects, advantages and novel features of the present invention will become apparent from the following detailed description of one or more preferred embodiments when considered in conjunction with the accompanying drawing.

BRIEF DESCRIPTION OF THE DRAWING

The appended single FIG. 1 shows an axle support according to an embodiment of the invention in a diagrammatic illustration.

DETAILED DESCRIPTION OF THE DRAWING

Referring to FIG. 1, only a single connection point is designed in accordance with the invention—in reality, all connection points, or at least those connection points which are symmetrical with respect to the center of the vehicle, will be equipped with a reinforcement element according to the invention. By means of the simplified illustration here, it is in effect the case that, on the left and on the right, two different axle support designs for an embodiment are shown.

An axle support 1 of a motor vehicle has two longitudinal members 2 and two crossmembers 3 which connect the longitudinal members 2. The longitudinal members 2 and the crossmembers 3 are in each case connected to one another at connection points 4—four of which are thus provided.

The axle support 1 has body attachment points 6. At the body attachment points 6, the axle support 1 is connectable to a body of the vehicle. Furthermore, wheel attachment points 7 are formed in particular on the longitudinal members 2. Transverse links or longitudinal links, for example, are fastened to the wheel attachment points 7. Furthermore, the figure shows a total of three bearing points 8 on the crossmembers 3. At these bearing points 8, an engine or gearbox can be fastened to the axle support 1.

As shown by way of example for only a single connection point 4, a reinforcement element 5 composed of fiber-reinforced plastic is provided at the connection point 4. Here, the reinforcement element 5 is formed by virtue of a fiber-reinforced band being wound in crosswise fashion around the connection point 4. The reinforcement element 5 includes, aside from the reinforcement fibers, a plastics matrix which is cured in the finished state and which both connects the fibers to one another and realizes a microscopic form fit with the connection point 4 if the fiber-reinforced plastics band lies on a metallic base material of the axle support 1. (If the latter is itself composed of a plastics material, then a cohesive connection between the connection point 4 of the axle support 1 and the reinforcement element 5 is self-evidently possible). By contrast, in the example shown, the longitudinal members 2 and the crossmembers 3 are manufactured from metal and are welded or screwed to one another at the connection points 4. For the reinforcement of the connection points 4, the reinforcement elements 5 are wound on the connection points 4.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An axle support of a motor vehicle, comprising:
    two metallic longitudinal members;
    at least one metallic crossmember connected to the longitudinal members at connections points, the crossmember having body attachment points in end regions thereof;
    a reinforcement element provided at at least one of the connection points, the reinforcement element comprising fiber-reinforced plastic wound only around the connection point and a direct vicinity thereof.

2. The axle support according to claim 1, wherein
    the reinforcement element is connected to a base material of the axle support via thermal joining at the connection point.

3. The axle support according to claim 2, wherein
    the reinforcement element is further connected in a form-fitting manner to a basic structure of the axle support at the connection point.

4. The axle support according to claim 1, wherein
the reinforcement element has an endless, unidirectional fiber reinforcement wound in a crosswise fashion around the connection point.

5. The axle support according to claim 1, wherein
the reinforcement element is composed of one of: carbon-fiber-reinforced plastic, glass-fiber-reinforced plastic, aramid-fiber-reinforced plastic or natural-fiber-reinforced plastic.

6. The axle support according to claim 1, wherein
the longitudinal members and the at least one crossmember are composed of a light metal alloy or a steel at least in a region of the connection point.

7. The axle support according to claim 1, wherein
the connection point, without the reinforcement element, is in a form of a cohesive, force-fitting, and/or form-fitting connection.

8. The axle support according to claim 1, wherein
the reinforcement element comprises an additional layer composed of a material without reinforcement fibers.

9. An axle support of a motor vehicle, comprising:
two longitudinal members;
at least one crossmember connected at connection points to the two longitudinal members, the crossmember having body attachment points in end regions thereof, wherein
the axle support is configured to be installed with identical geometric dimensions on motor vehicle types which differ in regard to at least one of their weight and drive power,
in a usage situation in a motor vehicle type of relatively high weight and/or high drive power, at least one connection point is equipped with a reinforcement element composed of wound-on fiber-reinforced plastic, and
in a usage situation in a motor vehicle type of relatively low weight and/or drive power, the reinforcement element is either eliminated or configured with smaller dimensions than in the usage situation in the motor vehicle type of relatively high weight and/or drive power.

10. The axle support according to claim 9, wherein
the reinforcement element is connected to a base material of the axle support via thermal joining at the connection point.

11. The axle support according to claim 10, wherein
the reinforcement element is further connected in a form-fitting manner to a basic structure of the axle support at the connection point.

12. The axle support according to claim 9, wherein
the reinforcement element has an endless, unidirectional fiber reinforcement wound in a crosswise fashion around the connection point.

13. The axle support according to claim 9, wherein
the reinforcement element is composed of one of: carbon-fiber-reinforced plastic, glass-fiber-reinforced plastic, aramid-fiber-reinforced plastic or natural-fiber-reinforced plastic.

14. The axle support according to claim 9, wherein
the longitudinal members and the at least one crossmember are composed of a light metal alloy or a steel at least in a region of the connection point.

15. The axle support according to claim 9, wherein
the connection point, without the reinforcement element, is in a form of a cohesive, force-fitting, and/or form-fitting connection.

16. The axle support according to claim 9, wherein
the reinforcement element comprises an additional layer composed of a material without reinforcement fibers.

17. A method for producing an axle support of a motor vehicle, the method comprising the acts of:
providing two longitudinal members and at least one crossmember connected at connection points to the two longitudinal members, the crossmember having body attachment points in end regions thereof; and
winding a fiber reinforced band only around at least one of the connection points and a direct vicinity thereof to form a reinforcement element for the axle support.

18. The method according to claim 17, wherein
the band is wound together with a matrix in a wet form or the band is preimpregnated with a matrix and/or comprises hybrid yarns, and
the band is heated before, during, and/or after being wound around the connection point.

* * * * *